United States Patent [19]

Russell et al.

[11] Patent Number: 4,571,679
[45] Date of Patent: Feb. 18, 1986

[54] FAULT TREE DATA ARRAY

[75] Inventors: William R. Russell, late of Baltimore, Md.; Samuel G. Russell, executor, Landenberg, Pa.

[73] Assignee: The United States of America as represented by the Secretary of the Navy, Washington, D.C.

[21] Appl. No.: 529,465

[22] Filed: Sep. 6, 1983

[51] Int. Cl.$^4$ .............................................. G06F 11/00
[52] U.S. Cl. ..................................... 364/300; 364/900
[58] Field of Search ... 364/200 MS File, 900 MS File, 364/300

[56] References Cited

U.S. PATENT DOCUMENTS

| | | | |
|---|---|---|---|
| 4,353,298 | 10/1982 | Baker et al. | 101/93.05 |
| 4,355,360 | 10/1982 | Asano et al. | 364/431.11 |
| 4,468,728 | 8/1984 | Wang | 364/200 |

Primary Examiner—Raulfe B. Zache
Attorney, Agent, or Firm—R. F. Beers; H. A. David

[57] ABSTRACT

A fault tree data array converts the logic of a fault tree into software by using a data base technique. Each array element of a data array contains a decision or termination of the fault tree, and a relative exponential addressing expression provides the data elements with a unique position in the array. The next position in the data array to be examined is calculated by the relative exponential addressing expressions. For unsymmetrical fault trees on additional data array is generated to provide a sequential list of tests to be examined until a fault is found. Then the relative exponential addressing technique is used. The result is a more compact method of storing data in computer memory, hence providing an efficient method for implementing fault trees into software.

1 Claim, 3 Drawing Figures

FAULT TREE DATA ARRAY

BACKGROUND OF THE INVENTION

1. Field of the Invention

The present invention relates to computer controlled malfunction detection and indication processes, and more particularly to a fault tree data array for converting the logic of a fault tree into software by using data base techniques.

2. Description of Prior Art

The process of fault isolation either for maintenance purposes or for reconfiguration depends on a logical analysis of the system and the results of test performed on the system. A fault tree is a group of decision nodes that are logically sequenced to arrive at a conclusion. For each decision there can be only one of two possible outcomes and for each succeeding decision there can be only two additional outcomes. What is desired is a method for efficiently converting the logic of a fault tree into software for computer control of the fault isolation process.

SUMMARY OF THE INVENTION

Accordingly, the present invention provides a fault tree data array for converting the logic of a fault tree into software by using data base techniques. Each array element of a data array contains a decision or termination of the fault tree, and a relative exponential addressing expression provides the data elements with a unique position in the array. The next position in the data array to be examined is calculated by the relative exponential addressing expression. For an unsymmetrical fault tree an additional data array is generated to provide a sequential list of tests to be examined until a fault is found. Then the relative exponential addressing technique is used. The result is a more compact method of storing data in computer memory, hence, providing an efficient method of implementing fault trees into software.

Therefore, it is an object of the present invention to provide a fault tree data array for converting more efficiently the logic of a fault tree into software.

Other objects, advantages and novel features of the present invention will be apparent from the following detailed description when read in conjunction with the appended claims and attached drawing.

DESCRIPTION OF THE PREFERRED EMBODIMENT

Figure 1:
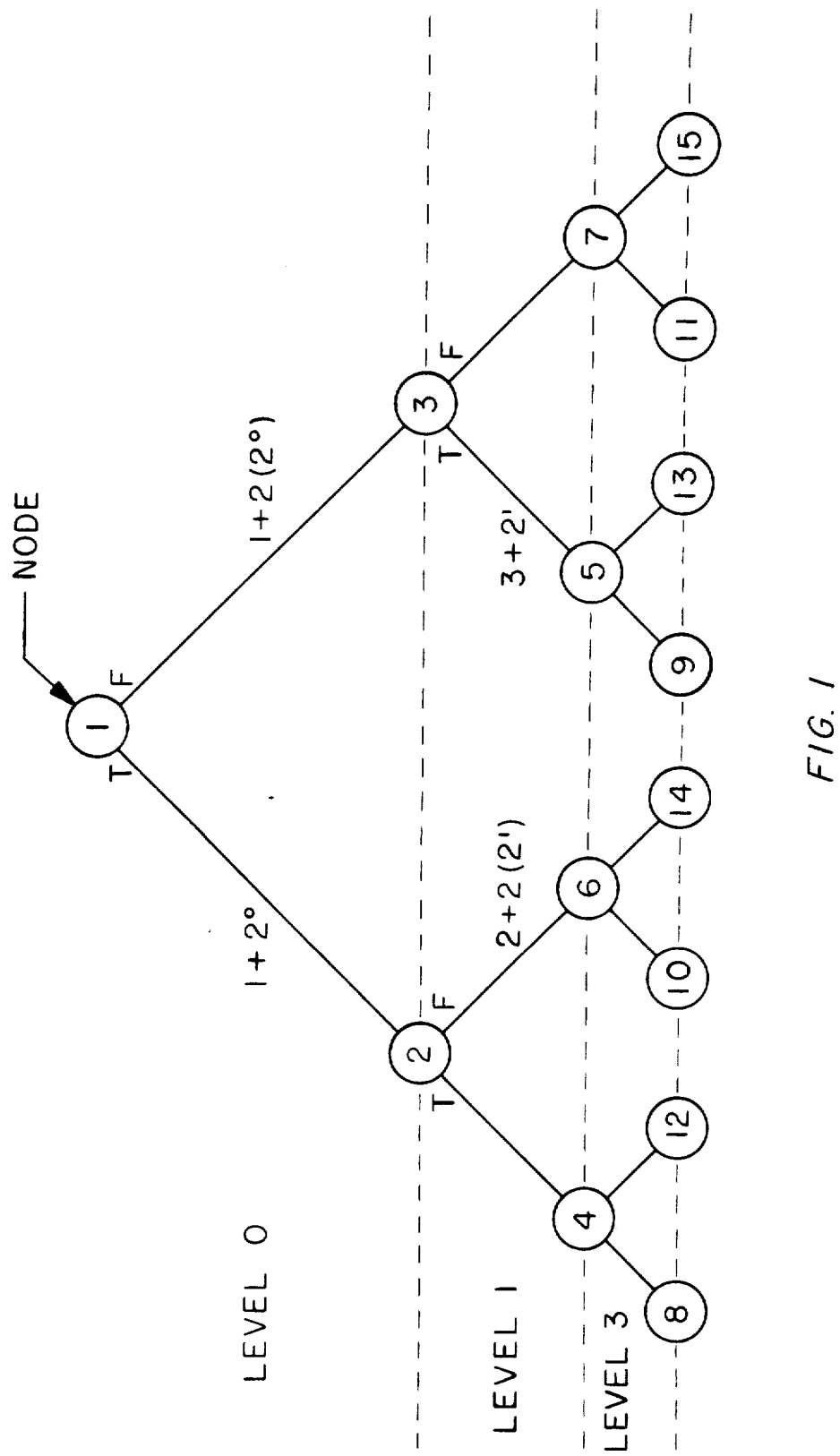
FIG. 1 is a schematic view of a symmetrical decision tree.

A fault tree that has two possible outcomes for each decision element is shown in FIG. 1 to go from decision 1 to decision 2 the outcome must be true; conversely to get from decision 1 to decision 3 the outcome must be false. If each decision is considered to be a node and the tree level to be the number of previous decision made, then a mathematical description for moving through the tree can be expressed as follows:

for true results $$A(T)_{n+1} = A_n + 2^L, \text{ and} \quad (1)$$

for false results $$A(F)_{n+1} = A_n + 2 (2^L), \quad (2)$$

where A=node number, L=tree level, and n=present node being analyzed.

Using equations (1) and (2) data can be generated for a software program that exactly depicts the logic of a fault tree. This process is referred to as relative exponential addressing. In this process equations (1) and (2) provide a method to assign a unique address scheme to a data array. Therefore, each array element contains a decision or termination and equations (1) and (2) provide the data elements with a unique position in the array. Depending upon the outcome of the present decision being considered, the next position in the data array to be examined will be calculated by equations (1) or (2).

Figure 2:
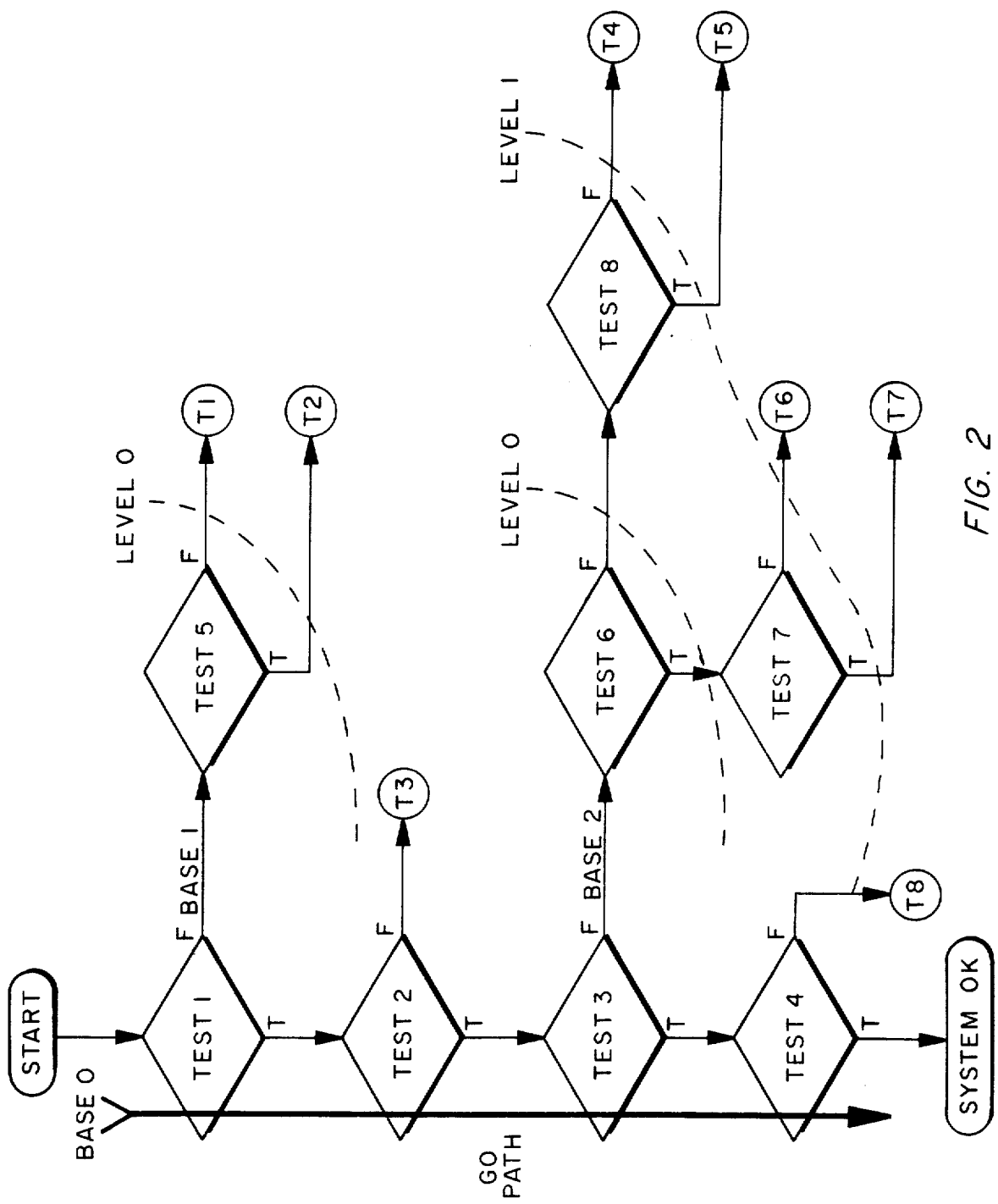
FIG. 2 is a schematic view of an asymmetrical fault tree.

For a typical fault tree as shown in FIG. 2 the data contained in each decision diamond would be (a) the result of a test made on the system under test, or (b) a termination point which is a message containing the necessary information required to identify the faulty component. As shown most fault trees are not as symmetrical as that shown in FIG. 1. The result is that several data elements of the data array do not contain any data, wasting computer memory. This problem is solved by breaking the fault tree into several smaller trees where each branch is more condensed. As shown the left column of decisions contains the tests that perform an overall check of the system, known as a "Go Path". The "Go Path " is a string of logic elements which, if followed through for a system without a fault, ultimately yields a "System OK" conclusion. Using the concept of exponential addressing with "Go Path" an additional data array is generated. This array provides a sequential list of tests that are to be examined until a fault is found, at which time the exponential addressing technique is employed.

The resulting data arrays depecting the fault tree of FIG. 2 is shown in Tables I and II:

TABLE I

| Base Address 0 Relative Address | Data Content Results of Test No. | Subordinate Array Address | Termination Message Address |
|---|---|---|---|
| 1 | 1 | — | — |
| 2 | — | Base 1 | — |
| 3 | 2 | — | — |
| 4 | — | — | T3 |
| 5 | 3 | — | — |
| 6 | — | Base 2 | — |
| 7 | 4 | — | — |
| 8 | — | — | T8 |
| 9 | — | — | System OK |

TABLE II

| Subordinate Data Arrays | | Data Content | |
|---|---|---|---|
| Base Address | Relative Address | Result of Test No. | Termination Message Address |
| Base 1 | 1 | 5 | — |
| | 2 | — | T1 |
| | 3 | — | T2 |
| Base 2 | 1 | 6 | — |
| | 2 | 7 | — |
| | 3 | 8 | — |
| | 4 | — | T7 |
| | 5 | — | T5 |
| | 6 | — | T6 |

TABLE II-continued

| Subordinate Data Arrays | | Data Content | |
|---|---|---|---|
| Base Address | Relative Address | Result of Test No. | Termination Message Address |
| | 7 | — | T4 |

Figure 3:
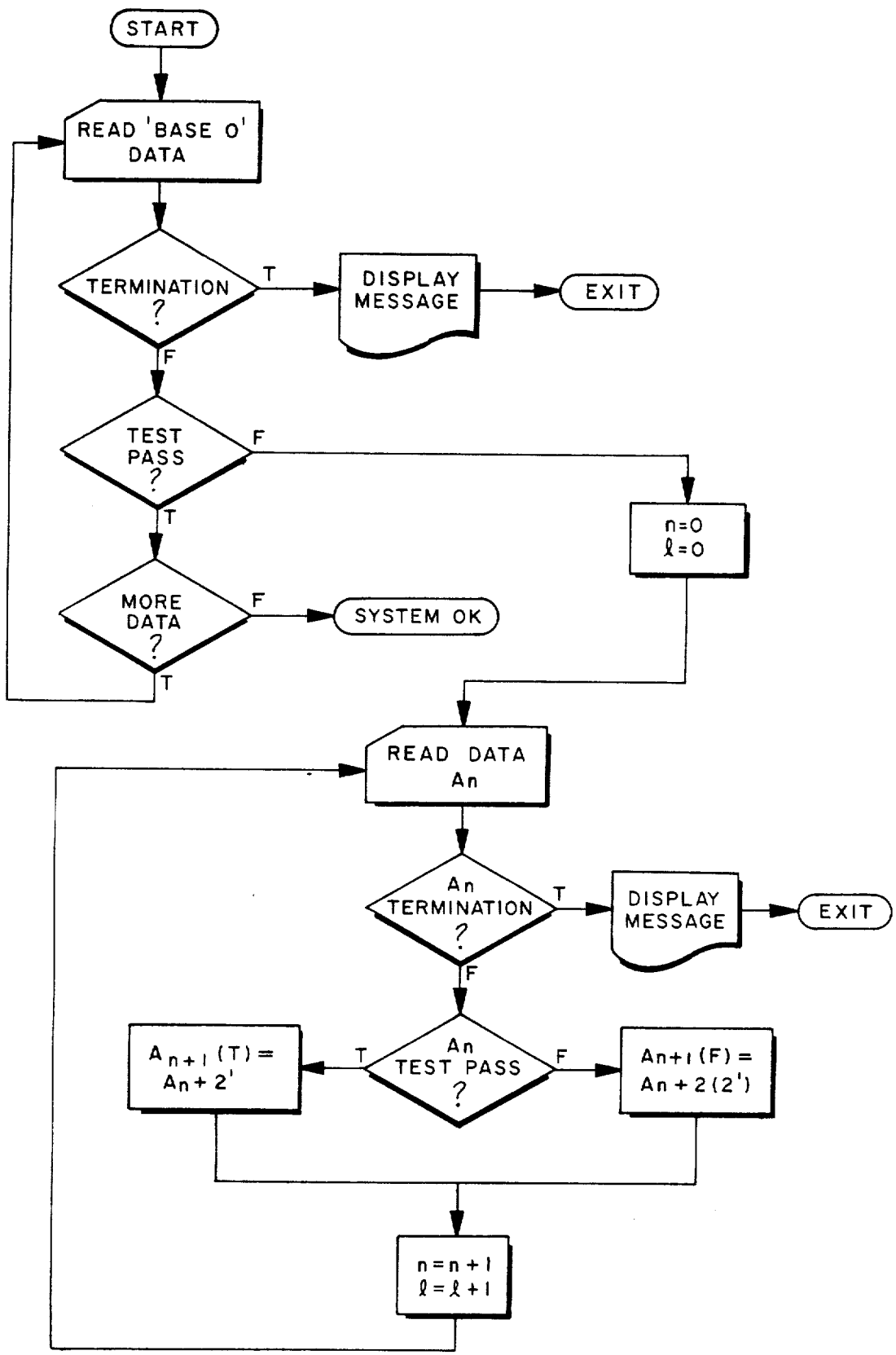
FIG. 3 is a software flow chart for the fault tree of FIG. 2.

A typical software program for expontential addressing with "Go Path" is shown in FIG. 3 in the form of a flow chart. This program is contained in the computer controlled malfunction detection and indication system to interpret the data and isolate the fault.

Thus, the present invention provides a fault tree data array which provides a more efficient use of computer and computer memory by using a relative exponential addressing technique.

What is claimed is:

1. A method for use in computer controlled detection and indication of a malfunction in a system, said method comprising the steps of:
providing a plural level fault tree wherein alternative true and false decisions are arranged as information nodes of a data array to be examined in a sequence to lead to a conclusion;
examining nodes in a predetermined first path for true (T) or false (F) status;
examining subsequent nodes in accordance with the expressions $A(T)_{n+1} = A_n + 2^L$ for true results $A(F)_{n+1} = A_n + 2(2^L)$ for false results where A = node number, L = tree level, and n = present node being examined, until a conclusion is reached.

* * * * *